United States Patent [19]

Wardman et al.

[11] 4,394,814

[45] Jul. 26, 1983

[54] ENERGY GENERATION SYSTEM

[76] Inventors: John C. Wardman, 1060 San Tomas Aquino Rd., Campbell, Calif. 95008; James Y. Adams, 26966 W. Fremont Rd., Los Altos Hills, Calif. 94022

[21] Appl. No.: 249,908

[22] Filed: Apr. 1, 1981

[51] Int. Cl.³ ............................................. F03G 7/02
[52] U.S. Cl. ............................... 60/641.15; 60/641.8; 60/659; 126/415; 126/424; 126/448; 62/315
[58] Field of Search .................. 60/641.8, 641.15, 659; 126/438, 415, 424, 446, 447, 448; 62/315, 316

[56] References Cited

U.S. PATENT DOCUMENTS

| | | | |
|---|---|---|---|
| 1,770,276 | 7/1930 | Koch | 62/315 |
| 2,182,788 | 12/1939 | Cornell, Jr. | 62/315 |
| 3,841,738 | 10/1974 | Caplan | 126/438 |
| 3,995,429 | 12/1976 | Peters | 60/641 |
| 4,018,581 | 4/1977 | Ruff et al. | 62/2 |
| 4,055,948 | 11/1977 | Kraus et al. | 60/641.8 |
| 4,063,419 | 12/1977 | Garrett | 60/641 |
| 4,068,476 | 1/1978 | Kelsey | 60/671 |
| 4,091,800 | 5/1978 | Fletcher | 126/415 |
| 4,094,147 | 6/1978 | Alleau et al. | 60/641.8 |
| 4,158,291 | 6/1979 | Jones | 60/641 |
| 4,217,886 | 8/1980 | McLaughlin | 126/446 |
| 4,241,724 | 12/1980 | Hull | 126/415 |

Primary Examiner—A. Michael Chambers

[57] ABSTRACT

An energy generation system includes a motive fluid which is alternately heated and cooled to drive a heat engine. An inexpensively built and operated system heats the motive fluid with solar radiation and cools it with atmospheric or wind cooling. Low cost solar heat collectors are fabricated with aluminum foil or aluminized Mylar reflective surface overlying parabolically shaped paperboard bases. Low cost fluid cooling devices are fabricated from various fluid carrying porous canvas bags, some being provided with wind catching devices.

7 Claims, 14 Drawing Figures

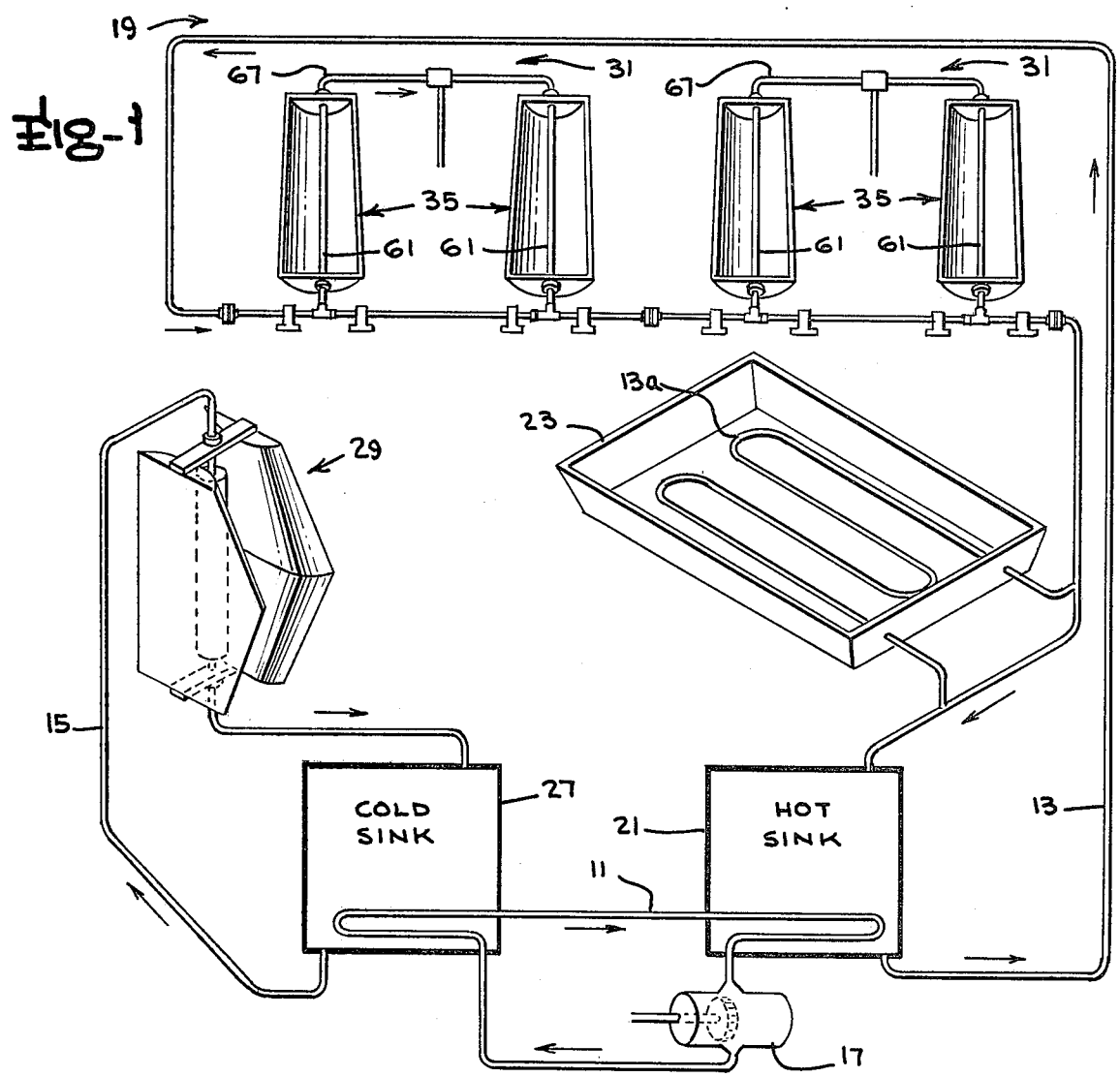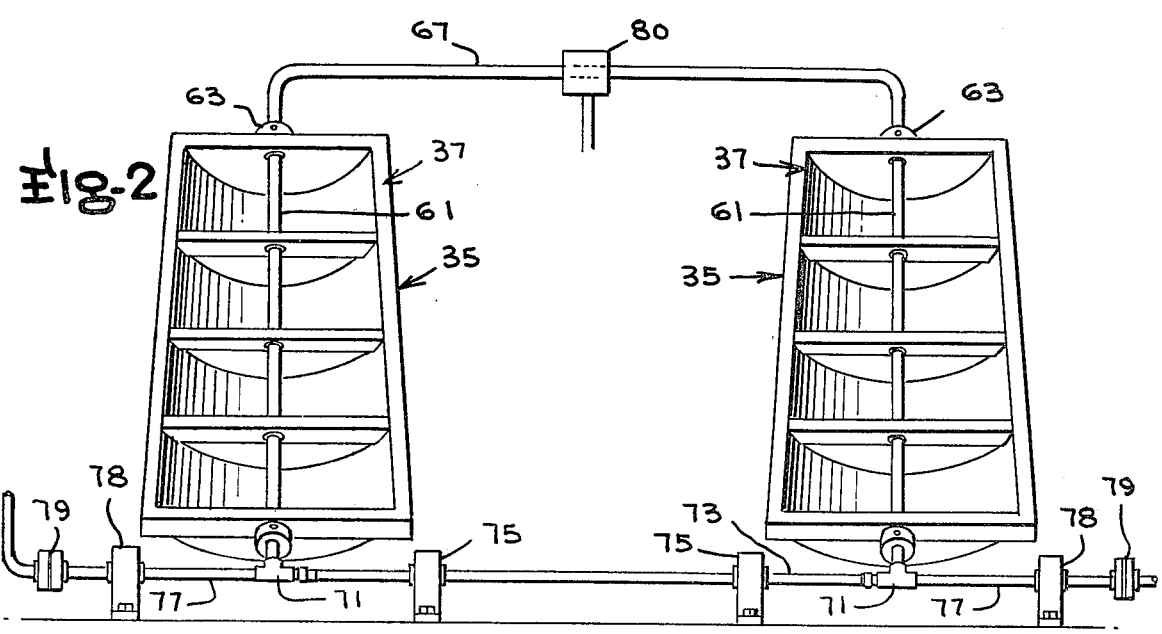

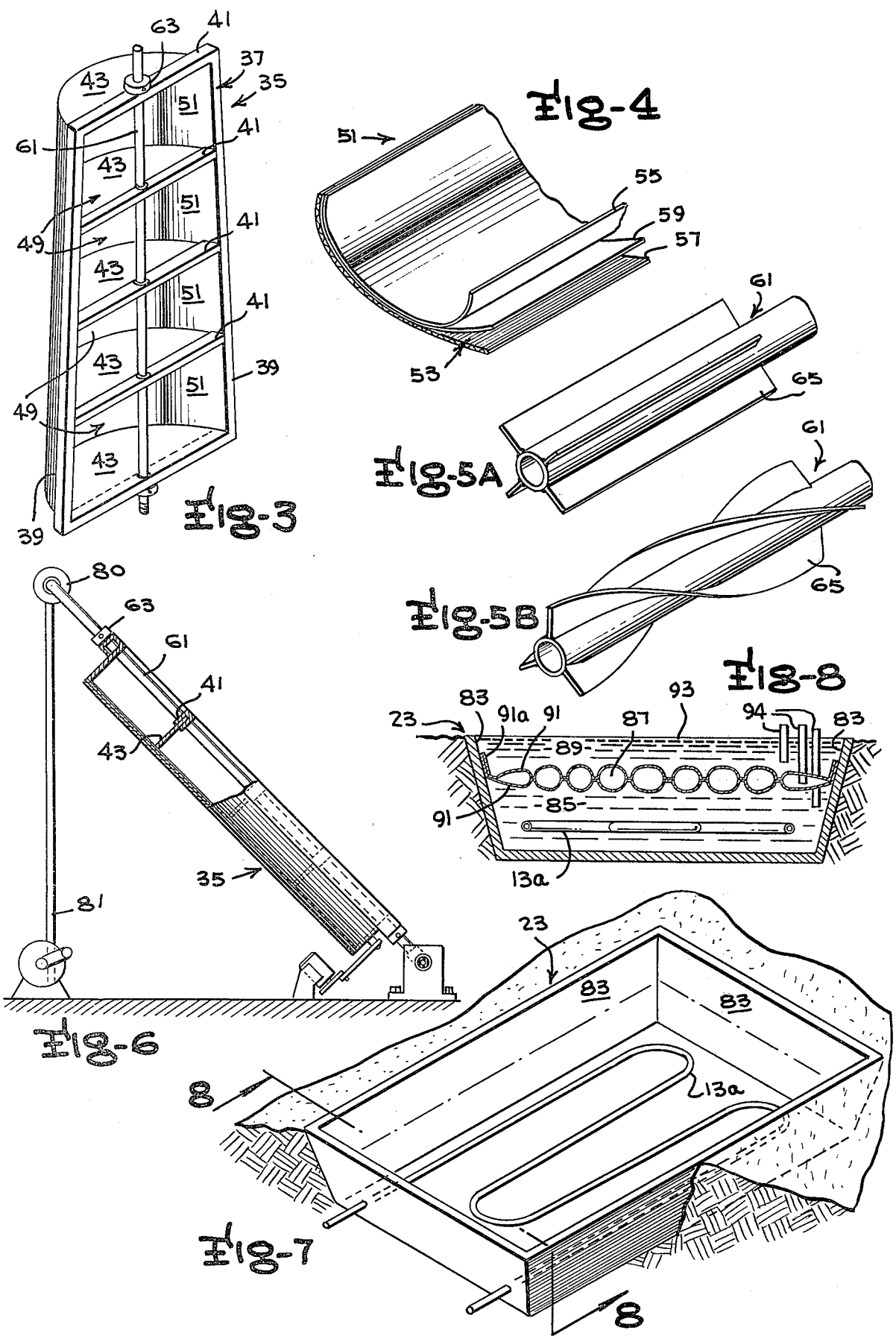

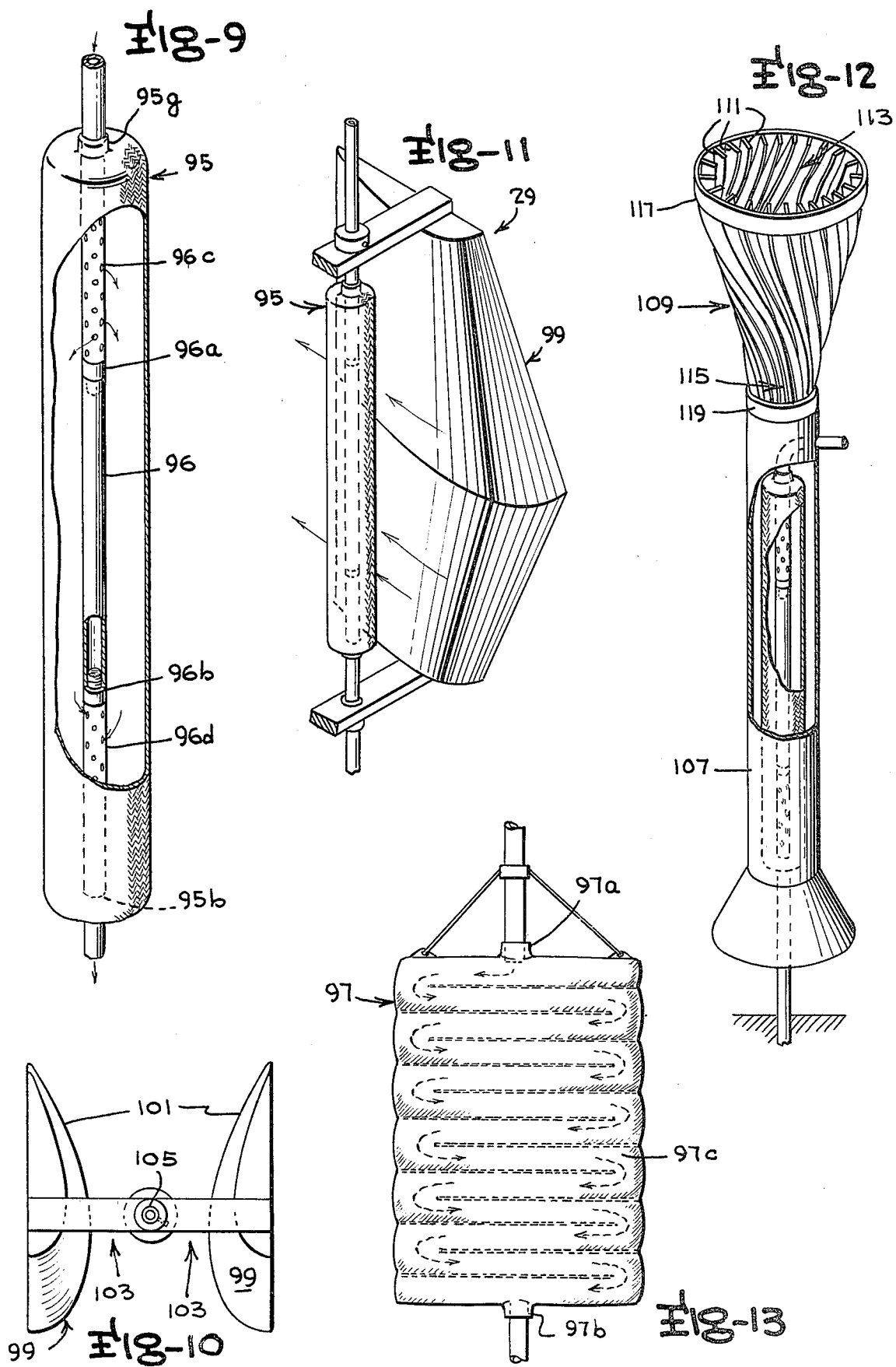

ENERGY GENERATION SYSTEM

TECHNICAL FIELD

The present invention relates to an energy generation system having an alternately heated and cooled motive fluid for driving a heat engine and more particularly to such a system employing improved low cost components to produce inexpensive solar heating and atmospheric or earth cooling of the motive fluid.

BACKGROUND ART

With the world-wide concern for the shortage of liquid and gas fossil fuel energy sources, much effort has been devoted to further development of alternative methods of producing motive power relatively inexpensively. Such alternative methods include nuclear energy, hydroelectric energy, geothermal energy, coal and solar energy. Nuclear energy and coal are fraught with environmental problems. They, along with hydroelectric power, require vast capital investment. Geothermal energy sources are in minimal supply considering the aggregate energy demand in this country.

The final alternative, solar energy, has received much public attention because it is obviously a free source of energy, and for practical purposes, an infinite one. However, its use has been limited for several resons, not the least of which is that the only effective solar equipment available has been complex in design, and consequently expensive to build and maintain.

There is, therefore, the need for solar energy conversion equipment which is simple in design, and inexpensive to construct and maintain.

DISCLOSURE OF INVENTION

A solar powered energy generation system comprises a solar collector and a heat storage device. A heat engine is provided which is driven by a motive fluid. A first fluid transfers heat from the solar collector to the motive fluid to evaporate and expand that fluid prior to its passing to the heat engine. Intermediate the solar collector and the motive fluid, the first fluid passes in heat exchange relationship with the heat storage device. A second fluid absorbs and removes heat from the motive fluid leaving the heat engine.

In preferred practice the solar collector comprises a frame supported mirror fabricated from a paperboard base and an overlying reflective layer such as polished aluminum or an aluminum Mylar. The collector further comprises a copper conduit for conducting the first fluid to be heated along a line approximating the locus of points defining the focus of the mirror. Fins are attached to the conduits outer periphery to optimize the heat absorption capacity of the conduit relative to the mirror.

In a further aspect of the invention the solar pond comprises multiple fluid layers: a lowermost relatively deep salt-water layer having a high salt concentration; an intermediate, relatively shallow, brackish water layer having a relatively low to intermediate salt concentration; and an upper, relatively shallow fresh-water layer.

In another aspect of this invention the second fluid, which cools the motive fluid, is subjected to evaporative cooling by passing the liquid through a porous canvas container. Seepage on the bag's exterior surface is subjected to natural atmospheric breezes which evaporate the seepage, cooling the bag's contents in the process.

In a further aspect of this invention wind catching apparatus is provided to catch and accelerate breezes ove the bag's surface, thereby improving the efficiency of the evaporative cooling process.

BRIEF DESCRIPTION OF DRAWINGS

FIG. 1 is a schematic diagram illustrating the flow paths of the various heat transfer and motive fluids among the various components of the disclosed system.

FIG. 2 is an elevation view of a portion of the system's solar collector array.

FIG. 3 is a perspective view of one of the collectors of the solar collector array shown in FIG. 2.

FIG. 4 is a perspective view of a mirror panel of one of the collectors of FIG. 2 with portions of adjacent layers of the mirror panel illustrated in spaced relationship for clarity.

FIGS. 5A and 5B are end views of collector pipes of the solar panel of FIG. 3. These collector pipes are provided with distinct heat fin arrangements.

FIG. 6 is an end elevation view of a portion of the system's solar collector array.

FIG. 7 is a perspective view of the system's solar pond.

FIG. 8 is a cross sectional view of the pond of FIG. 7.

FIG. 9 is a perspective view of an elongate canvas porous bag in which a heated liquid is cooled by an evaporative cooling technique.

FIG. 10 is a plan view of the canvas bag of FIG. 9 used in combination with a pair of spaced, diametrically opposed delta shaped air foils which catch and deflect ambient air currents over the bag's exterior surface.

FIG. 11 is a perspective view of the bag and air foil arrangement of FIG. 10 with one of the air foils removed for purposes of clarity.

FIG. 12 is a perspective view of the porous canvas bag of FIG. 9 in combination with an alternative structure for catching and deflecting ambient air currents over the bag's exterior surface.

FIG. 13 is an elevation view of an alternative porous canvas bag.

BEST MODE FOR CARRYING OUT THE INVENTION

Referring to FIG. 1, a schematic diagram illustrates the energy generation system of this invention which converts the heat energy of the sun into a mechanical output by alternately heating and cooling a vaporizable motive fluid which operates a heat engine.

Briefly stated, the system of this invention comprises three fluid circuits; a motive fluid circuit 11, a heating fluid circuit 13 and a cooling fluid circuit 15.

The motive fluid circuit includes a heat engine 17 driven by a heat-energized motive fluid.

The heating fluid circuit 13 includes a solar collector array 19 as well as a heat sink 21 which is in heat exchange relationship with the motive fluid circuit 11 upstream of the heat engine. A first heat transfer fluid, hereinafter called the heating fluid, transfers heat from the solar collector array 19 through the circuit 13 to the heat sink 21. The heat added to the heat sink vaporizes motive fluid passing to the heat engine 17. Circuit 13 also includes a heat storage device 23 which absorbs and retains excess heat from the heating fluid and then releases it to the heating fluid when needed.

The cooling fluid circuit 15 includes a cold sink 27 which is in heat exchange relationship with the motive fluid circuit 11 downstream of the heat engine. A second heat transfer fluid, hereinafter called the cooling fluid, removes heat from the cold sink whereby motive fluid passing from the heat engine is condensed and thus prepared for subsequent heating and vaporization in the heat sink. The circuit 15 can also include a fluid cooling device 29 which receives cooling fluid exiting the cold sink and cools that cooling fluid before returning it to the cold sink.

Viewing the system of this invention in detail it is again seen that the motive fluid circulates through its own fluid circuit 11 to drive heat engine 17.

The heat engine 17 may take numerous forms including but not limited to a low temperature turbine or a double headed piston and mating cylinder.

The motive fluid is limited to a specific group of fluids, including among others, water or water and antifreeze, as required by climate. What limits the choice of the motive fluid is the vaporization temperature which it must be capable of reaching in the heat sink 21 because operation of this system is dependent on the system being able to alternately vaporize and condense the motive fluid. Energy for driving the heat engine is supplied to the motive fluid by heating that fluid in the heat sink to evaporate and expand it before it passes to the heat engine so that the energy generated in this expansion can be employed to drive the heat engine. Subsequently, that fluid is cooled to condense it and reduce its volume so that the fluid is in condition to be reheated and re-expanded as it is recirculated.

The heating fluid circuit 13 is again seen to include the solar collector array 19, the heat sink 21, and the heat storage device 23.

The solar collector array 19 comprises a plurality of solar collector assemblies 31. Each collector assembly 31 (FIG. 2) comprises a pair of solar collectors 35.

Each collector 35 (FIG. 3) has a rectangular frame 37 comprising a pair of similar elongate side rails 39 interconnected by a limited number of shorter, similar cross rails 41. The frame 37 supports an equal limited number of flat ribs 43 in parallel planes each containing a cross rail and extending perpendicular to the plane of the frame 37. Each rib 43 is characterized by a linear edge and a curved edge shape as a parabola. The linear edge of each rib 43 is equal in length to the cross rails 41. Each rib 43 is attached along its linear edge to the frame 37 at a separate one of the cross rails 41. Each adjacent pair of ribs 43 cooperates with its associated pair of cross rails 41 and the side rails 39 to define a separate mirror panel support section 49.

A curved mirror panel 51 is provided whose curvature is made to coincide with the curvature of the parabolic edges of the ribs 43. Each such panel 51 is fitted along its concave surface to the adjacent ribs comprising each mirror panel support section 49 and attached by conventional mechanical means (not shown) to the rib and side rails.

The mirror panel 51 provides a significant cost advantage over prior art solar mirror panels. That panel 51 (see FIG. 4) comprises a heavy weight paperboard base 53 supporting an off-the-shelf reflective layer 55 such as polished aluminum foil or Mylar with an aluminum layer on one surface.

The paperboard base 53 may be a laminated product comprising a corrugated cardboard base 57 to which a relatively heavy, smooth-faced posterboard 59 is glued with a waterproof epoxy or plastic resin type glue. The reflective layer is glued to the smooth-faced posterboard 59. The paperboard laminate is necessarily waterproofed and stiffened into the desired parabolic shape with a plastic resin sealant.

Alternatively, the paperboard base 53 may be a unitary member manufactured with opposed corrugated and smooth faces. Then panels made of such materials could easily be given a parabolic shape during formation while still wet.

A copper collector pipe 61 (FIG. 2) is provided for each solar collector 35. The pipe 61 is positioned to coincide with the locus of points defining the focus of the several mirror panels 51 serially arranged in each collector 35. Bearings are positioned centrally of each cross rail 41 to support the pipe 61 in the focus of the collector mirrors 51. The bearings enable the collector to be rotated relative to its pipe 61. The pipe 61 extends beyond the ends of the collector 35 enabling thrust collars 63 to be attached to the pipe 61 immediately above and below the solar collector. These thrust collars 63 resist longitudinal movement of each collector 35 relative to its pipe 61.

Considering the low cost construction of this solar collector 35 and its associated mirror panels 51, the actual focus of those mirror panels and the focus anticipated by the bearings locating the pipe 61 may not coincide precisely. Therefore radially extending copper heat fins 65 (FIGS. 5A, 5B) are welded to the periphery of each pipe 61 within the ends of the collector to accommodate such imprecision while full advantage is still taken of the low cost construction of the mirror panels 51. The heat fins 65 extend both radially outward of each pipe 61 and down the length of the pipe, either along a straight line or in a helical twist about the pipe. By effectively increasing the radiation absorbing surface area of the pipe these heat fins increase the ability of their pipe to catch solar radiation in their collector.

The pair of collector pipes 61 in each assembly are interconnected at their upper ends by a heat insulated conduit 67 (FIG. 2). At their lower ends each pipe 61 in the assembly 31 terminates in a three way fitting 71. A structural member, for example a conduit 73 with each end plugged, connects the facing openings of the two fittings in each assembly. The conduit 73 is rotatably mounted in bearings 75. An insulated fluid conduit 77 is attached to the remaining opening in each fitting 71 in fluid communication with the associated pipe 61. Each fluid conduit 77 is rotatably mounted in a bearing 78 similar to the bearings 75. Each of these conduits 77 terminates at its opposite end in a flexible fluid coupling 79. Thus, separate assemblies 31 are joined in fluid communication at these flexible fluid couplings 79.

The solar collectors are provided with the ability to be reoriented to maximize their efficiency in converting solar radiation to heat energy.

First, each collector 35 can be rotated about an axis defined by its pipe 61. Rotation of the collector enables it to be constantly aligned with the sun's radiation as the sun travels across the sky during the day. An electric motor controlled by a sunlight responsive electronic sensor provides such rotation. Neither the motor nor sensor is shown in detail (FIG. 6).

Second, each collector assembly 31 can be tilted relative to the ground to adjust its collectors relative to the angle of the sun's radiation striking the earth. Since the sun is lower in the sky in the winter than in the summer, adjustment of the collectors is necessary as the seasons change to keep the collectors facing into the sun as directly as possible to maximize the radiation which is collected.

Capability of the assembly to tilt is provided by the bearings 75, 78 in which the conduits 73, 77 are mounted. The assembly, as shown in FIG. 6, includes a suitable mechanical elevating device, indicated generally at 81, for engaging the conduit 67 at 80, and applying a raising or lowering motion to it which causes the assembly 31, including the conduits 73, 77, to rotate in bearings 75, 78. One suitable elevating device comprises a simple rack and pinion manually operated by a hand crank.

It is noted that the flexible fluid couplings 79 enable individual solar collector assemblies 31 to be tilted relative to the next adjacent assemblies without rupturing the fluid connections between these assemblies.

As seen in FIG. 1, heating fluid exiting the solar collector array 19 flows through the circuit 13 to heat sink 21 where the heating fluid gives up heat to the motive fluid.

The heat sink 21 can take numerous forms. What is required is that the heating fluid and the motive fluid pass in non-commingling heat exchange relationship within the heat sink. In one form the heat sink 21 comprises a bath through which the heating fluid is circulated. The motive fluid circulates through a conduit passing through the heating bath.

A heat storage device in the form of a solar pond 23 (FIGS. 7, 8) is connected with the circuit 13 intermediate the solar collector 19 and the heat sink 21. The solar pond, in addition to its heat storage function, also serves as a solar collector. Structurally, the pond 23 is an enclosure, open at the top, and further characterized by sidewalls 83 which slope inward with increasing depth. To maximize solar radiation absorption the surfaces of the sidewall and bottom wall are covered with a black pigmented material. For example, the pond could be made of black polyvinyl chloride lined wood or black fiberglass. Alternatively the pond could be dug in or emplaced above ground and buttressed by a bank of earth. Then the pond could be lined with one-fourth inch of asphalt coated with a rubberized coal tar pitch emulsion.

The enclosure contains a body of fluid which actually absorbs direct solar radiation and transforms it into heat energy which it can store. The solar pond fluid also absorbs heat from and releases heat to the heating fluid which flows in circuit 13. A branch loop 13a of circuit 13 is run through the solar pond 23. Valves (not shown) control circulation of the heating fluid through the branch loop 13a. Opening those valves and allowing heating fluid to enter branch loop 13a enables additional heat to be transferred to the pond's own fluid by the heating fluid or vice versa, depending on the relative temperatures of the respective fluids.

The solar pond's fluid is actually comprised of three separate and distinct layers of fluid: a lowermost salt-water layer 85, an intermediate brackish water barrier 87, and an uppermost fresh-water cap 89. The lowermost salt-water layer 85 is the actual heat storage layer. It is a relatively deep layer. As the surface area of the pond 23 is increased the heat storage capacity of the salt-water layer 85 is also increased. Additionally, the maximum possible temperature which the heat storage salt-water layer 85 can reach is increased as the layer 85 is made deeper. Overall the layer 85 has a relatively high concentration of salt. Specifically, the salinity of layer 85 increases with increasing depth. A relatively shallow brackish water barrier 87, having a relatively low to intermediate salt concentration, is floated between the salt-water layer 85 and the fresh-water layer 89. The fresh-water layer 89 enables solar radiation to enter and heat up the lower salt-water layer 85 and at the same time insulate the heated salt-water layer 85 from the atmosphere. Convection currents which normally operate in heated bodies of water to raise hot water to the surface, tend to be blocked by such a fresh-water layer. Since this stratification of fresh-water and salt-water layers is subject to disruption by wind, earth tremors caused by heavy traffic, earthquakes, sonic booms, and low level flights, other measures are necessary. Consequently, the brackish water barrier 87 is interposed between the salt-water layer 85 and fresh-water layer 89.

Beyond the employment of the intermediate brackish water barrier 87 other efforts are desirable to maintain actual physical separation of the adjacent layers of water while allowing solar radiation to pass through the upper layers into the salt-water layer 85. Therefore, transparent plastic film layers 91 are provided above and below the brackish water barrier 87 at the interfaces with the adjacent water layers. The plastic film layers 91 may define a sealed plastic envelope wholly enclosing the brackish water barrier 87. The sealed plastic envelope may be constructed similarly to a conventional air mattress, i.e., a plurality of contiguous interconnected tubes, but inflated with brackish water rather than air. Peripheral portions 91a of each layer 91 are overlain in contiguous relationship and sealed to each other to form a skirt. The skirt may be anchored to the sidewalls of the pond in a sealing relationship to insure that separation between the salt-water layer 85 and the fresh-water layer 89 is maintained. Alternatively, the skirt may extend up the pond sidewalls 83 and be anchored to the edge of the pond bank.

The pond's fluid may be further protected by a single layer of transparent plastic film 93 overlying the top surface of the fresh-water layer 89. The film layer 93 prevents windblown debris such as leaves from entering the water.

Any plastic film employed for either layers 91 or layer 93 should be thin (e.g., 4 mils being a suggested maximum thickness), resistant to tearing, and highly transparent to sunlight. Suggested films are Tedlar manufactured by E. I. DuPont and Co. or Saran manufactured by Dow Chemical Co.

Proper maintenance of the solar pond requires access to each fluid layer. Hydrometer readings must be made periodically to check the salinity of the brackish water and salt-water layers 85, 87. Salt or fresh water needs to be added periodically to maintain the desired level of salinity. Chemicals need to be introduced into the pond to eliminate algae. The removal of all fluid from the brackish water and fresh-water layers 87, 89 is necessary to repair damage to the twin plastic film layers 91 or to the overlying plastic film layer 93. Accordingly, tubes or standpipes 94 are provided to give access to each of the pond layers 85, 87, and 89.

The cooling fluid circuit 15 is again seen to include the cold sink 27 and may further include a fluid cooling device 29 (FIG. 1). Cooling fluid circulating through the circuit 15 passes through the cold sink 27 which is in heat exchange relationship with motive fluid exiting the heat engine 17 in circuit 11. Cold sink 27 is similar to heat sink 21, comprising a bath through which cooling fluid is circulated while the motive fluid circulates through a conduit passing through a cooling bath.

The cooling fluid may comprise ground water pumped up to the earth's surface by a pump operated by the heat engine 17. In this instance ground water has been pumped to the surface for some specified purpose. Its use as a cooling fluid is limited to a single pass through the cooling sink 27 after which it is put to its intended use. However, for all intents and purposes there is an unlimited supply of ground water to be pumped and thus an unlimited supply of cooling fluid.

When the system of this invention is used for other purposes than pumping ground water, a cooling fluid may have to be specially provided and periodically re-cooled so that it can cool the motive fluid. For such purposes it is proposed to use water as the cooling fluid and to circulate from the cooling sink 27 to the fluid cooling device 29 and back.

The cooling device 29 comprises a porous canvas bag through which the cooling fluid is circulated. Two styles of such bags 95, 97 are illustrated in FIGS. 9, 13, respectively.

Bag 95 is an elongate, generally cylindrically shaped member having an entrance 95a and an exit 95b in its opposite ends for respectively receiving and exhausting fluid to be cooled.

To insure that the cooling fluid entering the bag circulates within the bag without passing directly from the entrance to the exit a partly perforated conduit 86 is provided. The conduit 96 carries fluid to the bag 95, and then extends fully through the length of the bag from its entrance 95a to its exit 95b.

An unperforated central portion of the conduit length fully within the confines of the bag is blocked to prevent the passage of fluid therethrough. Spaced plugs 96a, 96b may be disposed in the conduit 96 for this purpose. The conduit sidewall is perforated along end portion 96c between the bag entrance 95a and the plug 96a. Additionally, the conduit sidewall is perforated along end portion 96d between the bag exit 95b and the plug 96b. Consequently any fluid circulating through the conduit 96 is forced to exit through conduit end portion 96c, circulate through the confines of the bag, and reenter the conduit through end portion 96d to continue its passage through the cooling circuit 15.

Bag 97 is also an elongate canvas bag, but is wider and flatter than bag 95. Bag 97 is provided with baffles between its entrance and exit, 97a, 97b, respectively. The baffles define a zig-zag fluid path 97c between the bag's entrance and exit to insure that all cooling fluid entering the bag will circulate through it without immediately exiting the bag.

Each bag is adapted to be supported in the open air and subject to natural breezes. Small amounts of fluid leaking through the bag wall are evaporated by the breezes and a chilling effect is produced on the bag and its contents. This chilling effect can be enhanced by additionally providing the cooling device 29 with wind catching apparatus to artificially accelerate air over the surface of the canvas bag.

The bag 95 of FIG. 9 is shown in combination with wind catching apparatus in FIGS. 1 and 10–11. The wind catching apparatus comprises a pair of similar delta-shaped airfoils 99. For purposes of clarity in FIG. 11 one airfoil is removed. These airfoils 99 are disposed in spaced relationship and in diametrically opposed positions about the bag 95 (FIG. 10). Their cambered surfaces 101 are oriented face to face in a mirror image relationship to define a constricted air path 103 between the respective airfoils. The airfoils 99 are linked together for rotation as a unit about a vertical axis in the air path intermediate the airfoils. The elongate bag 95 is supported within the air path so that the bag's longitudinal axis is generally coaxial with the vertical axis 105 about which the airfoils rotate. The rotatable airfoil assembly is responsive to wind direction to point the apex of each delta-shaped airfoil into the wind, thereby catching natural breezes of air and accelerating them over the cambered airfoil surfaces 101 past the bag 95 to produce the desired chilling effect.

The bag 95 of FIG. 9 is shown in combination with alternative wind catching apparatus in FIG. 12. That apparatus comprises a vertically oriented elongate tubular shell 107. Means are provided to support the bag 95 within the shell so that the bag's longitudinal axis generally coincides with the longitudinal axis of the shell 107. The bag is supported in spaced relationship to the shell to enable air to be guided by the shell over the bag's surface. A wind catching vortex generator 109 is mounted to the upper end of the shell. The vortex generator 109 comprises an array of spaced vanes 111 defining an inverted truncated cone oriented about a vertical axis. The vanes 111 curve inwardly and downwardly from a larger diameter upper end 113 remote from the shell to a smaller diameter lower end 115 of the array adjacent the top end of the shell. The vanes are provided at the upper and lower ends with rings 117, 119, respectively. Each ring secures the vanes at its end of the array in spaced relation.

The vanes 111 are fixed so that wind passing between the vanes is forced downward into a swirling air current that accelerates as the vanes curve inward. This vortex generator thus catches horizontally moving air currents and redirects them downward, accelerating them past the canvas bag to produce the desired chiling effect.

In the operation of this system the solar collectors 35 in the solar array 19 are aimed at and track the movement of the sun across the sky. The solar radiation is captured by the collector mirrors 51 and focussed on their copper collector pipes 61. Misfocussed radiation is absorbed by the peripherally attached copper heat fins 65.

Heating fluid circulating through the fluid circuit 13 enters the solar collector array 19. The heating fluid passes serially through each collector assembly, absorbing heat from each collector pipe 61.

The now heated fluid exits the solar array 19 and travels through the circuit 13 toward the solar pond 23 and heat sink 21. Solar radiation entering the solar pond, passes through the upper fluid layers and is trapped in the lower salt-water layer as heat. The heating fluid can be diverted from circuit 13 through the branch loop 13a; heat can be transferred from that heating fluid to the solar pond or vice versa, depending on the relative temperatures of the heating fluid and the solar pond's own fluid.

The heated fluid then exists the solar pond and circulates through the heat sink 21 before returning to the solar array 19 to repeat the process.

Motive fluid circulating through the circuit 11 is heated and vaporized as it passes through the heat sink 21 in heat transfer relation with the heating fluid.

Leaving the heat sink, the evaporated motive fluid flows to the heat engine 17 where it expands, driving the engine to produce motive power. Leaving the heat engine the motive fluid passes through the cold sink 27 where it passes in heat exchange relationship with cooling fluid. The motive fluid is condensed to liquid form and circulated back to the hot sink to repeat the process.

Cooling fluid, such as water, circulating through circuit 15, absorbs heat from the motive fluid passing through the cold sink 27. The now heated cooling fluid circulates to the fluid cooling device 29 where it is subjected to an evaporative cooling process by breezes caught and accelerated over the surface of a porous canvas bag. The now cooled cooling fluid is then recirculated back to the cold sink.

Although the invention has been described in its preferred form with a certain degree of particularity, it is understood that the present disclosure of the preferred form has been made only by way of example and numerous changes in the details of construction and the combination and arrangement of parts may be resorted to without departing from the spirit and scope of the invention as hereinafter claimed. It is intended that the patent shall cover, by suitable expression in the appended claims, whatever features of patentable novelty exist in the invention disclosed.

We claim:

1. A solar powered energy generation system comprising:
   (a) a solar collector comprising
      1. at least one mirror, the mirror further comprising a laminated panel including a paperboard base having a generally parabolic cross-sectional shape and a reflective sheet overlaying the concave face of the parabolic base;
      2. a copper conduit for conducting the first fluid means, the conduit positioned along a line approximating the locus of points defining the focus of the mirror;
      3. means mounting the collector for rotating the mirror's reflective overlay toward the sun;
      4. means mounting the collector for tilting the mirror and conduit relative to the angle of the sun's radiation to the earth;
   (b) a heat storage device;
   (c) a heat engine;
   (d) motive fluid means driving the heat engine;
   (e) first fluid means transferring heat from the solar collector to the motive fluid means, the first fluid means passing in heat exchange relationship with the heat storage device intermediate the solar collector and the motive fluid means; and
   (f) second fluid means for absorbing and removing heat from the motive fluid means, and
   (g) wind means for cooling the second fluid means.

2. The system of claim 1 and further including fin means attached to the outer periphery of the copper circuit to optimize the heat absorption capacity of that conduit relative to the mirror.

3. A solar powered energy generation system, comprising:
   (a) a solar collector, comprising
      (i) at least one mirror, the mirror further comprising a laminated panel including a paperboard base having a generally parabolic cross sectional shape and a reflective sheet overlaying the concave face of the parabolic base;
      (ii) a copper conduit positioned along a line approximating the locus of points defining the focus of the mirror,
      (iii) fins attached to the external surface of the conduit to optimize the heat absorption capacity relative to the mirror,
      (iv) means mounting the collector for rotating the mirror's reflective overlay toward the sun and
      (v) means mounting the collector for tilting the mirror and conduit relative to the angle of the sun's radiation to the earth,
   (b) a solar pond comprising,
      (i) a relatively deep salt-water body having a relatively high concentration of salt, the salinity of this salt-water body increasing with depth,
      (ii) a relatively shallow fresh-water body floated atop the salt-water body and exposed directly to solar radiation,
      (iii) a relatively shallow brackish water barrier having a relatively low to intermediate concentration of salt, the brackish water barrier interposed between the lower salt-water body and the upper fresh-water body, and
      (iv) an enclosure for the sides and bottom of the body of fresh, brackish and salt water, the sidewalls of the enclosure sloping inward with increasing depth, the sidewall surfaces and the bottom wall being covered with a black pigmented material and
      (v) standpipes to each body of water;
   (c) a volatile fluid;
   (d) a heat engine driven by the volatile fluid;
   (e) a heat sink;
   (f) a cold sink;
   (g) means circulating the volatile fluid serially in heat exchange relationship with the heat sink where heat is absorbed by the volatile fluid, then to the heat engine to drive it, and thereafter in heat exchange relationship with the cold sink where heat is given up by the volatile fluid;
   (h) a first heat transfer fluid;
   (i) means circulating the first heat transfer fluid serially through the copper conduit of the solar collector where heat is absorbed by the first heat transfer fluid, then in heat exchange relationship with the solar pond, and thereafter in heat exchange relationship with the heat sink;
   (j) a second heat transfer fluid;
   (k) an evaporative cooling device; and
   (l) means circulating the second heat transfer fluid serially through the evaporative cooling device and in heat exchange relationship with the cold sink.

4. A solar powered energy generation system, comprising:
   (a) a solar collector;
   (b) a heat storage device;
   (c) a heat engine;
   (d) motive fluid means driving the heat engine;
   (e) first fluid means transferring heat from the solar collector to the motive fluid means, the first fluid means passing in heat exchange relationship with the heat storage device intermediate the solar collector and the motive fluid means;
   (f) the second fluid means recirculating to a heat absorbing relationship with the motive fluid means following cooling of the second fluid means; and
   (g) wind means for cooling the second fluid means comprising,
      (i) an open ended elongate canvas bag through which the second fluid means is circulated from one end to the other, the container being defined by a wall structure which permits some seepage of its contents to its exterior surface;

(ii) means within the bag for deflecting the path of the second fluid means to prevent its direct passage from the bag entrance to the bag exit; and (iii) means for guiding and accelerating atmospheric air over the container's exterior surface to generate a wind chilling effect, thereby producing cooling of the second fluid means in the container by evaporating the exposed seepage, said air guiding means comprising a pair of similar delta-shaped airfoils linked together in spaced relationship, the cambered surfaces of the respective airfoils oriented face to face in a mirror image relationship to define a constricted air path between the respective airfoils, the linked airfoils mounted for rotation about a vertical axis in the air path intermediate the airfoils and responsive to wind direction to point the apex of each delta-shaped airfoil into the wind, the elongate bag oriented with its longitudinal axis generally coaxial with the vertical axis in the air path.

5. A solar powered energy generation system, comprising:
(a) a solar collector;
(b) a heat storage device;
(c) a heat engine;
(d) motive fluid means driving the heat engine;
(e) first fluid means transferring heat from the solar collector to the motive fluid means, the first fluid means passing in heat exchange relationship with the heat storage device intermediate the solar collector and the motive fluid means;
(f) the second fluid means recirculating to a heat absorbing relationship with the motive fluid means following cooling of the second fluid means; and
(g) wind means for cooling the second fluid means comprising, (i) an open ended elongated canvas bag container through which the second fluid means is circulated from one end to the other, the container being defined by a wall structure which permits some seepage of its contents to its exterior surface; and (ii) means within the bag for deflecting the path of the second fluid means to prevent its direct passage from the bag entrance to the bag exit; and (iii) means for guiding and accelerating atmospheric air over the container's exterior surface to generate a wind chilling effect thereby producing cooling of the second fluid means in the container by evaporating the exposed seepage, said air guiding means comprising, (a) a vertically oriented elongate tubular shell;

(b) means supporting the bag within the shell, the bag's longitudinal axis generally coinciding with the longitudinal axis of the shell, the bag and shell being in spaced relationship to enable air to be guided by the shell over the bag's surface; and (c) a wind catching vortex generator communicating with the upper end of the shell, the vortex generator comprising an array of spaced vanes defining an inverted truncated cone oriented about a vertical axis the vanes curving inwardly and downwardly from a larger diameter upper end remote from the shell to a smaller diameter lower end of the array proximate the upper end of the shell.

6. The system of claim 5 wherein each of the vanes tapers to a reduced width as it curves inwardly and downwardly.

7. The system of claim 5 wherein a larger diameter upper ring and a smaller diameter lower ring are provided at the respective upper and lower ends of the vane array, each ring securing the vanes at its end of the array in spaced relation.

* * * * *